United States Patent
Chang et al.

(10) Patent No.: US 11,811,801 B2
(45) Date of Patent: Nov. 7, 2023

(54) ANOMALY DETECTION FOR MICROSERVICES

(71) Applicant: Nokia Solutions and Networks Oy, Espoo (FI)

(72) Inventors: Hyunseok Chang, Holmdel, NJ (US); Muralidharan Kodialam, Marlboro, NJ (US); T. V. Lakshman, Morganville, NJ (US); Sarit Mukherjee, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 196 days.

(21) Appl. No.: 16/999,548

(22) Filed: Aug. 21, 2020

(65) Prior Publication Data
US 2021/0058424 A1 Feb. 25, 2021

Related U.S. Application Data

(60) Provisional application No. 62/890,032, filed on Aug. 21, 2019.

(51) Int. Cl.
*G06F 21/00* (2013.01)
*H04L 9/40* (2022.01)
(Continued)

(52) U.S. Cl.
CPC ...... *H04L 63/1425* (2013.01); *G06F 11/3409* (2013.01); *G06F 18/214* (2023.01);
(Continued)

(58) Field of Classification Search
CPC ............. H04L 63/1441; H04L 63/0227; H04L 63/1425; G06F 11/3409; G06F 2201/835;
(Continued)

(56) References Cited

U.S. PATENT DOCUMENTS 7,424,619 B1 * 9/2008 Fan ..................... G06F 21/552
                                                          713/188
10,404,525 B2 * 9/2019 Larsson ............ H04L 41/0613
(Continued)

FOREIGN PATENT DOCUMENTS

CN     110149343  A  *  8/2019   .......... H04L 63/1416

OTHER PUBLICATIONS

E. Marchi, et al, "A novel approach for automatic acoustic novelty detection using a denoising autoencoder with bidirectional LSTM neural networks," 2015 IEEE International Conference on Acoustics, Speech and Signal Processing (ICASSP), 2015, pp. 1996-2000 (Year: 2015).*

*Primary Examiner* — Michael M Lee
(74) *Attorney, Agent, or Firm* — Duft & Bornsen, PC

(57) ABSTRACT

System, method, and software for detecting anomalies in data generated by microservices. In one embodiment, an anomaly detector collects performance metrics for a microservice deployed in a data center for an application. The anomaly detector transforms the performance metrics into a time-series structured dataset for the microservice, and feeds the structured dataset to a machine learning system to determine whether an anomaly exists in the structured dataset based on an anomaly detection model. The anomaly detector performs an anomaly classification with the machine learning system based on an anomaly classification model and the structured dataset when an anomaly is detected in the structured dataset, and performs an action based on the anomaly classification.

20 Claims, 6 Drawing Sheets

(51) Int. Cl.
  *G06F 11/34*   (2006.01)
  *G06F 18/214*  (2023.01)
  *G06N 3/044*   (2023.01)

(52) U.S. Cl.
  CPC ......... *G06N 3/044* (2023.01); *H04L 63/0227* (2013.01); *H04L 63/1441* (2013.01)

(58) Field of Classification Search
  CPC .. G06K 9/6256; G06K 9/6271; G06N 3/0445; G06N 7/005; G06N 20/00; G06N 3/088
  See application file for complete search history.

(56) References Cited

U.S. PATENT DOCUMENTS

| | | | |
|---|---|---|---|
| 10,970,395 B1* | 4/2021 | Bansal | G06F 21/566 |
| 2017/0352245 A1* | 12/2017 | Maher | G08B 21/182 |
| 2018/0357556 A1* | 12/2018 | Rai | G06N 20/00 |
| 2019/0028496 A1* | 1/2019 | Fenoglio | H04L 63/1425 |
| 2019/0095599 A1* | 3/2019 | Iliofotou | G06F 16/337 |
| 2019/0174319 A1* | 6/2019 | Backholm | H04L 63/0281 |
| 2019/0378048 A1* | 12/2019 | Shrivastava | G06F 16/90335 |
| 2020/0287923 A1* | 9/2020 | Raghavendra | G06N 3/0445 |
| 2020/0364128 A1* | 11/2020 | Vittal | G06F 16/128 |
| 2020/0394496 A1* | 12/2020 | Lev | G06K 9/00496 |
| 2022/0050897 A1* | 2/2022 | Gaddam | G06N 3/006 |

\* cited by examiner

ANOMALY DETECTION FOR MICROSERVICES

RELATED APPLICATIONS

This non-provisional patent application claims priority to U.S. Provisional Patent Application No. 62/890,032 filed on Aug. 21, 2019, which is incorporated by reference as if fully provided herein.

TECHNICAL FIELD

This disclosure relates to the field of network-based services, and more particularly, to a microservice architecture.

BACKGROUND

Modern cloud-based enterprise applications and emerging web-scale service architectures are increasingly realized using microservices due to their intrinsic benefits, such as high developer productivity, deployment agility, improved scalability, flexibility, resiliency, etc. Microservices, also referred to as a microservice architecture, are used in software development to structure an application as a collection of services (i.e., single-function modules) with well-defined interfaces and operations. In a microservice architecture, an application is broken down into smaller components or modules (i.e., microservices) that work together. The components of the application are separately developed and maintained in contrast to a traditional "monolithic" application that is developed all in one piece. Applications that are built as a set of modular components are easier to understand, easier to test, and easier to maintain over the life of the application.

A data center provides a computing platform for applications, such as ones that are developed using microservices. Increasing microservice-based tenant workloads in data centers pose new challenges for data center operators in terms of resource and performance management and security protection for tenant microservices. For example, the highly dynamic and distributed deployment nature of microservices makes diagnosis and troubleshooting of performance anomalies a non-trivial task. Also, emerging security threats exploit a high degree of inter-dependencies among deployed microservices to easily propagate laterally within a data center. Thus, it remains an issue to effectively monitor performance and security threats for microservices.

SUMMARY

Described herein is anomaly detection and handling for microservices. An anomaly detector as described herein collects data (e.g., performance metrics) from microservices, and uses a machine learning system to detect anomalies in the data. When an anomaly is detected for a microservice, the anomaly detector performs one or more actions to address the anomaly, such as to enforce policies of a data center. For example, the anomaly detector may isolate a microservice from other microservices if a malware infection is detected. The anomaly detector provides an efficient and automated way of detecting different types of performance and security anomalies so that microservice architectures can be deployed in a more effective and secure manner.

One embodiment comprises an anomaly detector that includes at least one processor and at least one memory including computer program code executable by the processor. The processor is configured to cause the anomaly detector to collect performance metrics for a microservice of a plurality of microservices deployed in a data center for an application. The processor is configured to cause the anomaly detector to transform the performance metrics into a time-series structured dataset for the microservice, and feed the structured dataset to a machine learning system to determine whether an anomaly exists in the structured dataset based on an anomaly detection model. The processor is configured to cause the anomaly detector to perform an anomaly classification with the machine learning system based on an anomaly classification model and the structured dataset when an anomaly is detected in the structured dataset, and perform an action based on the anomaly classification.

In another embodiment, the processor is further configured to cause the anomaly detector to implement a Long Short-Term Memory (LSTM) autoencoder to determine whether an anomaly exists in the structured dataset. The LSTM autoencoder is configured to yield a reconstruction loss based on the structured dataset, to detect an anomaly in the structured dataset when the reconstruction loss is greater than a reconstruction loss threshold, and to detect no anomaly when the reconstruction loss is less than or equal to the reconstruction loss threshold.

In another embodiment, the processor, in performing the action based on the anomaly classification, is further configured to cause the anomaly detector to block traffic to or from the microservice when the anomaly classification indicates a type of malware infection.

In another embodiment, the processor, in performing the action based on the anomaly classification, is further configured to cause the anomaly detector to report an alert to a customer of the data center when the anomaly classification indicates a type of non-malware issue involving a single customer.

In another embodiment, the processor, in performing the action based on the anomaly classification, is further configured to cause the anomaly detector to report an alert to an operator of the data center when the anomaly classification indicates a type of non-malware issue involving multiple customers.

In another embodiment, the processor is further configured to cause the anomaly detector to detect an unclassified anomaly when the machine learning system does not output a valid anomaly classification from the anomaly classification model, log the structured dataset, and re-train the anomaly classification model with the structured dataset and a new anomaly classification assigned to the unclassified anomaly.

In another embodiment, the processor is further configured to cause the anomaly detector to collect the performance metrics for the microservice with a tracer in the data center that uses extended Berkeley Packet Filter (eBPF) in-kernel tracing.

In another embodiment, the processor is further configured to cause the anomaly detector to perform a microservice classification with the machine learning system based on a microservice classification model and a sequence of system calls from the structured dataset when no anomaly is detected in the structured dataset, and report the microservice classification to an operator of the data center.

In another embodiment, the processor is further configured to cause the anomaly detector to re-train the microservice classification model of the machine learning system based on the structured dataset and the microservice classification determined for the microservice when no anomaly is detected in the structured dataset.

In another embodiment, the processor is further configured to cause the anomaly detector to re-train the anomaly detection model of the machine learning system based on the structured dataset for the microservice when no anomaly is detected in the structured dataset.

In another embodiment, the processor is further configured to cause the anomaly detector to perform the anomaly classification with the machine learning system based on the anomaly classification model from a group of N candidates when an anomaly is detected in the structured dataset, or add a new candidate to the group of N candidates when an anomaly is detected in the structured dataset and the machine learning system does not output a valid classification of the anomaly from the group of N candidates.

Another embodiment comprises a method of anomaly detection for a microservice. The method comprises collecting performance metrics for the microservice of a plurality of microservices deployed in a data center for an application, transforming the performance metrics into a time-series structured dataset for the microservice, and feeding the structured dataset to a machine learning system to determine whether an anomaly exists in the structured dataset based on an anomaly detection model. The method further comprises performing an anomaly classification with the machine learning system based on an anomaly classification model and the structured dataset when an anomaly is detected in the structured dataset, and performing an action based on the anomaly classification.

In another embodiment, determining whether an anomaly exists in the structured dataset based on the anomaly detection model comprises determining whether an anomaly exists in the structured dataset using an LSTM autoencoder by yielding a reconstruction loss based on the structured dataset, detecting an anomaly in the structured dataset when the reconstruction loss is greater than a reconstruction loss threshold, and detecting no anomaly when the reconstruction loss is less than or equal to the reconstruction loss threshold.

In another embodiment, performing an action based on the anomaly classification comprises blocking traffic to or from the microservice when the anomaly classification indicates a type of malware infection.

In another embodiment, performing an action based on the anomaly classification comprises reporting an alert to a customer of the data center when the anomaly classification indicates a type of non-malware issue involving a single customer.

In another embodiment, performing an action based on the anomaly classification comprises reporting an alert to an operator of the data center when the anomaly classification indicates a type of non-malware issue involving multiple customers.

In another embodiment, the method further comprises detecting an unclassified anomaly when the machine learning system does not output a valid anomaly classification from the anomaly classification model, logging the structured dataset, and re-training the anomaly classification model with the structured dataset and a new anomaly classification assigned to the unclassified anomaly.

In another embodiment, collecting performance metrics for the microservice comprises collecting the performance metrics for the microservice with a tracer in the data center that uses eBPF in-kernel tracing.

In another embodiment, the method further comprises performing a microservice classification with the machine learning system based on a microservice classification model and a sequence of system calls from the structured dataset when no anomaly is detected in the structured dataset, and reporting the microservice classification to an operator of the data center.

Another embodiment comprises a non-transitory computer readable medium embodying programmed instructions executed by one or more processors, where the instructions direct the processors to implement a method of anomaly detection. The method comprises collecting performance metrics for a microservice of a plurality of microservices deployed in a data center for an application, transforming the performance metrics into a time-series structured dataset for the microservice, and feeding the structured dataset to a machine learning system to determine whether an anomaly exists in the structured dataset based on an anomaly detection model. The method further comprises performing an anomaly classification with the machine learning system based on an anomaly classification model and the structured dataset when an anomaly is detected in the structured dataset, and performing an action based on the anomaly classification.

Another embodiment comprises a system that performs anomaly detection for a microservice deployed in a data center for an application. The system includes a means for collecting performance metrics for the, a means for transforming the performance metrics into a time-series structured dataset for the microservice, and a means for utilizing a machine learning system to determine whether an anomaly exists in the structured dataset based on an anomaly detection model. The system further includes a means for performing an anomaly classification with the machine learning system based on an anomaly classification model and the structured dataset when an anomaly is detected in the structured dataset, and a means for performing an action based on the anomaly classification.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
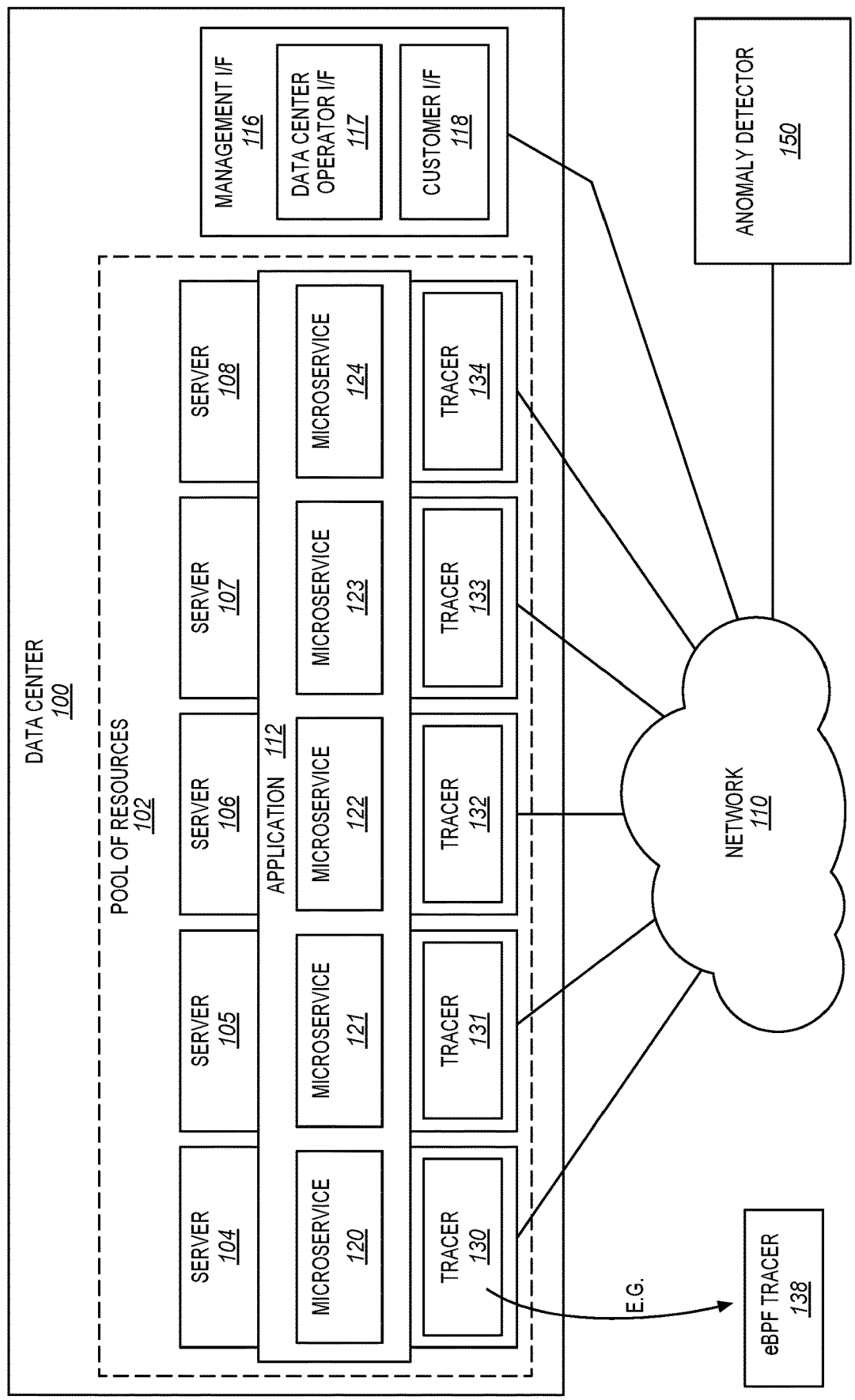
FIG. 1 illustrates a data center in an illustrative embodiment.

FIG. 1 illustrates a data center 100 in an illustrative embodiment. Data center 100 provides a computing platform infrastructure for hosting various applications. The computing platform for data center 100 may include a variety of equipment (e.g., routers, switches, security devices, storage systems, servers, application delivery controllers, etc.) that provides a pool of resources 102 that are physical and/or virtual, such as compute, storage, and network resources. The pool of resources 102 are used to provide services (e.g., cloud services) for end users, enterprise users, etc. Data center 100 may comprise a single tenant data center (e.g., a single instance of the software and supporting infrastructure serve a single customer), a Multi-Tenant Data Center (MTDC) (e.g., different types of software instances and supporting infrastructure serves multiple customers), etc.

The pool of resources 102 are at least partially provided by servers 104-108. Servers 104-108 and other resources of data center 100 may be co-located, or may be distributed over different geographic locations. Thus, servers 104-108 are shown as connected via a network 110. Network 110 may comprise a Wide Area Network (WAN), such as the Internet, a telecommunications network, an enterprise network, etc.

In this embodiment, an application 112 is hosted by one or more of servers 104-108. Application 112 is built with a microservice architecture comprising a set of microservices 120-124. A microservice architecture is an approach to developing application 112 as a suite of small services (e.g., microservices 120-124), each running in its own process and communicating with lightweight mechanisms, such as an HTTP resource Application Programming Interface (API). Servers 104-108 provide a platform for developing and/or executing microservices 120-124. Thus, each of the microservices 120-124 is shown as running on a server 104-108. Although individual microservices 120-124 are shown as running on different servers 104-108, one or more microservices 120-124 may run on the same server. Each server 104-108 is also shown as including a tracer 130-134. A tracer 130-134 is a component running on a server that is configured to track, trace, or monitor performance metrics for a microservice 120-124. In one embodiment, tracers 130-134 may comprise extended Berkeley Packet Filter (eBPF) tracers, which implement eBPF in-kernel tracing technology to track performance or operating metrics for a microservice. eBPF in-kernel tracing allows user-defined byte code (known as eBPF programs) to be dynamically attached to existing kernel hooks to monitor various kernel events. eBPF, along with its in-kernel key-value maps, may be used to collect a wide variety of timestamped performance, operating, or behavioral metrics of microservices 120-124 in a comprehensive and efficient manner.

Data center 100 may further include a management interface (I/F) 116 dedicated to configuration and management operations for data center 100, application 112, etc. Management interface 116 may include a data center operator interface 117 (or portal) and a customer interface 118 (or portal). A data center operator is a person that performs tasks for maintaining the equipment (e.g., servers) of data center 100, so that the equipment functions effectively and efficiently. Data center operator interface 117 is a component used to communicate with or access a data center operator. A customer is an entity that has an application hosted in data center 100. Thus, customer interface 118 is a component that provides a customer access to their application running within data center 100. Through customer interface 118, a user may view and/or manage deployment of an application 112 within data center 100, manage permissions, etc. Customer interface 118 may also be referred to as a tenant interface or a user interface.

Embodiments described herein provide anomaly detection and handling for microservices deployed in data center 100 or the like. Thus, an anomaly detector 150 is shown in communication with data center 100. At a high level, anomaly detector 150 is configured to collect data from microservices 120-124, and process the data to detect anomalies using machine learning (ML) functionalities. Anomaly detector 150 then performs an action or task based on the type of anomaly, according to policies (i.e., protection policies) implemented for data center 100. Thus, anomaly detector 150 provides an automated solution for detecting anomalies in microservices 120-124, and achieving automated enforcement of anomaly-dependent policies. Anomaly detector 150 may be implemented outside of data center 100 (e.g., on a different infrastructure) as shown in FIG. 1, may be implemented at data center 100 on the same infrastructure, or may be distributed between data center 100 and an external infrastructure.

Figure 2:
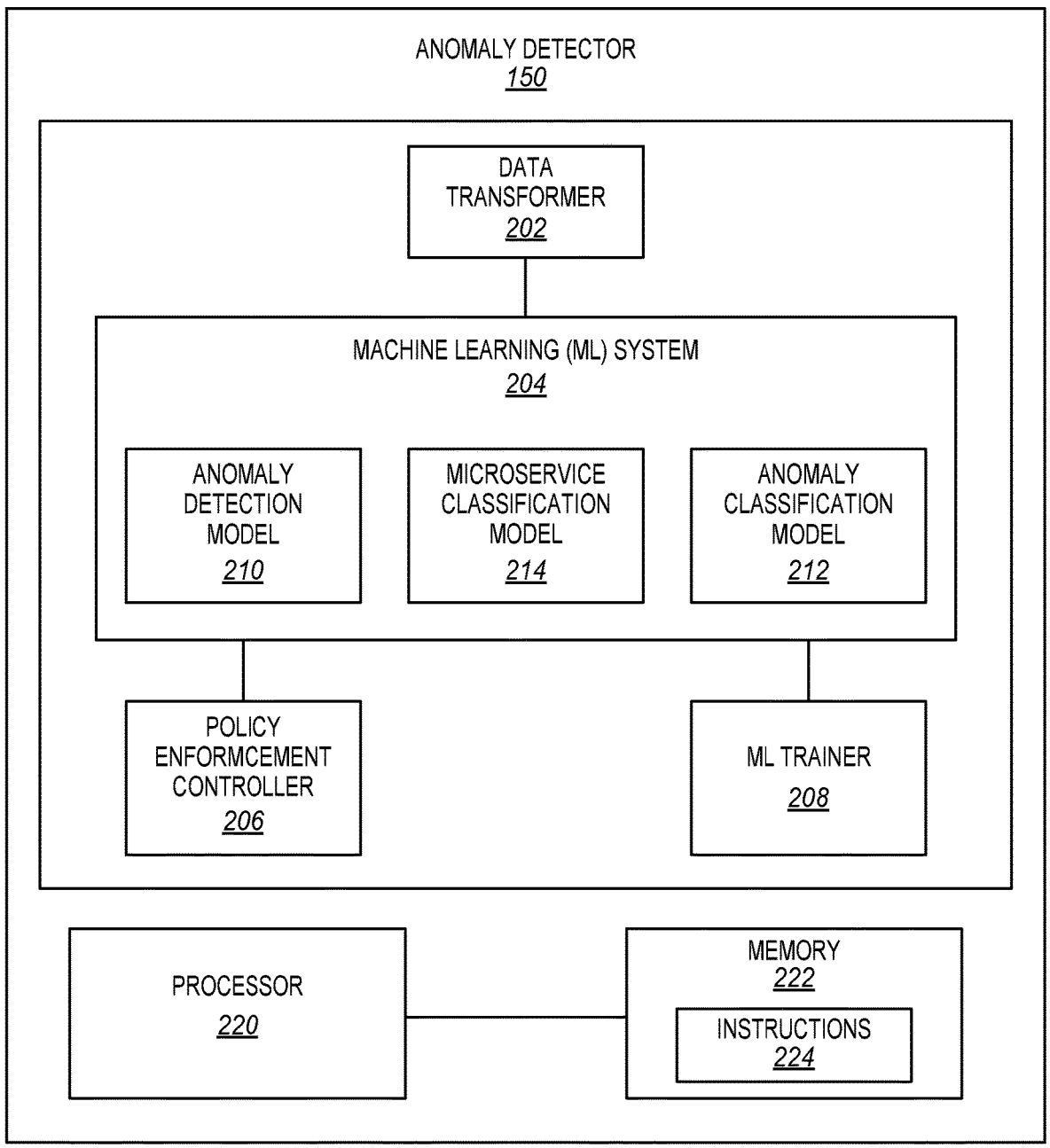
FIG. 2 is a block diagram of an anomaly detector in an illustrative embodiment.

FIG. 2 is a block diagram of anomaly detector 150 in an illustrative embodiment. Anomaly detector 150 is a server, device, apparatus, equipment (including hardware), system, means, etc., that performs anomaly detection for microservices. In this embodiment, anomaly detector 150 includes the following sub-systems: a data transformer 202, a machine learning (ML) system 204, a policy enforcement controller 206, and a ML trainer 208. Data transformer 202 may comprise circuitry, logic, hardware, means, etc., configured to convert or transform raw data into a structured dataset, such as a time-series dataset having a defined length and format. ML system 204 may comprise circuitry, logic, hardware, means, etc., configured to use machine learning techniques to perform functions, such as detect anomalies in data collected from microservices 120-124, to classify a type or category of anomaly, to classify a type or category of microservice 120-124, and/or other functions. ML system 204 may use supervised, semi-supervised, and/or unsupervised algorithms to iteratively learn from data traced from microservices 120-124 and/or other microservices, and/or other training data. In this embodiment, three ML models are illustrated for ML system 204: an anomaly detection model 210, an anomaly classification model 212, and a microservice classification model 214. ML system 204 is configured to build and use anomaly detection model 210 to detect anomalies in data collected from microservices. ML system 204 is configured to build and use anomaly classification model 212 to assign a classification, category, or type to an anomaly that is detected. ML system 204 is configured to build and use microservice classification model 214 to assign a classification, category, or type to a microservice. These models may be trained and maintained (e.g., retrained) individually, or may be a consolidated or global model that is trained and maintained as a whole. ML system 204 may build and use other models not shown in FIG. 2.

Policy enforcement controller 206 may comprise circuitry, logic, hardware, means, etc., configured to enforce policies associated with microservices 120-124. For example, protection policies may be defined for data center 100 in the event that an anomaly is encountered in a microservice. Based on the policy, the microservice may be temporarily isolated until the anomaly is cured, or other actions may be taken to protect other microservices and applications within data center 100. ML trainer 208 may comprise circuitry, logic, hardware, means, etc., configured to train or re-train one or more models of ML system 204. ML trainer 208 may be used to initially train ML system 204 in building the anomaly detection model 210, the anomaly classification model 212, and the microservice classification model 214 based on training data. ML trainer 208 may also re-train one or more of the models based on real-time data traced from the microservices when in operation.

Anomaly detector 150 may also be considered as including one or more of tracers 130-134 as shown in FIG. 1. As described above, tracers 130-134 are implemented on the same server as a microservice to collect data generated by the microservice. Tracers 130-134 are configured to provide the collected data to data transformer 202.

One or more of the subsystems of anomaly detector 150 may be implemented on a hardware platform comprised of analog and/or digital circuitry. One or more of the subsystems of anomaly detector 150 may be implemented on one or more processors 220 that execute instructions 224 (i.e., computer program code) stored in memory 222. Processor 220 comprises an integrated hardware circuit configured to execute instructions 224, and memory 222 is a computer readable storage medium for data, instructions 224, applications, etc., and is accessible by processor 220. Anomaly detector 150 may include additional components that are not shown for the sake of brevity, such as a network interface, a user interface, internal buses, etc.

Figure 3:
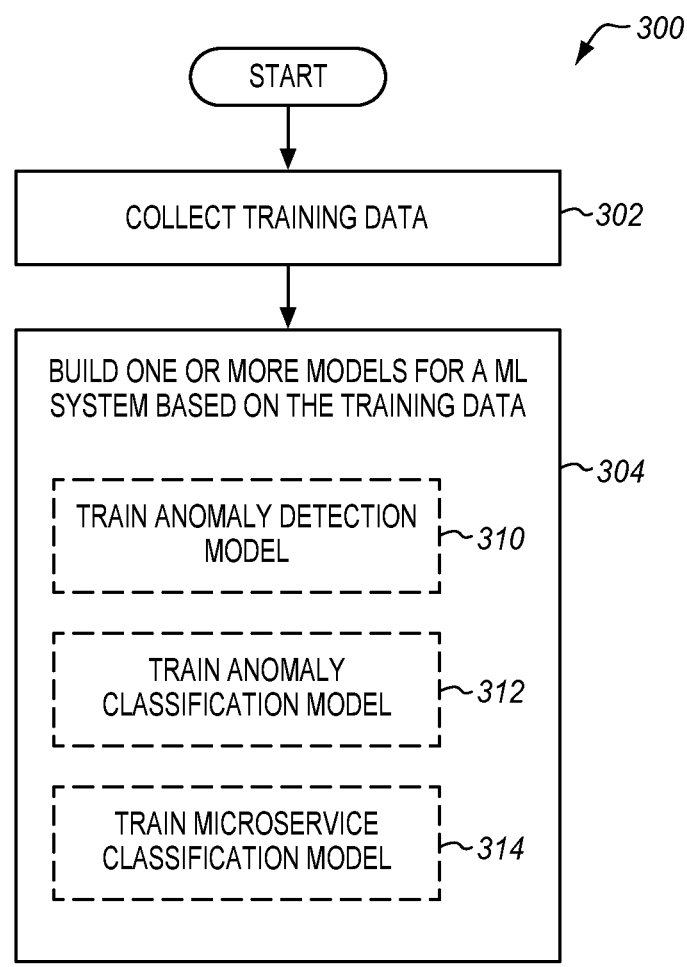
FIG. 3 is a flow chart illustrating a method of training an ML system in an illustrative embodiment.

In machine learning as used by ML system 204, there is generally a training phase and a testing phase (or operating phase). In the training phase, training datasets are used to build one or more models for ML system 204. FIG. 3 is a flow chart illustrating a method 300 of training ML system 204 in an illustrative embodiment. The steps of method 300 will be described with reference to ML system 204 in FIG. 2, but those skilled in the art will appreciate that method 300 may be performed in other systems. Also, the steps of the flow charts described herein are not all inclusive and may include other steps not shown, and the steps may be performed in an alternative order.

In step 302, training data is collected for microservices, such as by ML trainer 208. The training data is generally in the form of multi-dimensional time-series datasets. The training data is then used to build one or more models for ML system 204 (step 304) using machine learning algorithms. A model effectively encodes a mathematical function whose input is a feature vector and whose output is a classification. For step 304, ML trainer 208 may train anomaly detection model 210 (optional step 310), anomaly classification model 212 (optional step 312), and/or microservice classification model 214 (optional step 314).

To train anomaly detection model 210, for example, training data may be collected from a wide variety of microservices. For instance, microservices 120-124 of application 112 as shown in FIG. 1 may be operated in an isolated environment during a training phase. Thus, it may be assumed that the data collected from microservices 120-124 is normal and free from anomalies. Additionally or alternatively, training data may be collected from other microservices of a similar type, or may be generated by domain experts. Using the training data, ML trainer 208 may train anomaly detection model 210 so as to output an indicator (e.g., TRUE or FALSE) that an anomaly exists at a microservice based on an input of a structured dataset of performance metrics.

To train anomaly classification model 212, for example, training data may be obtained for each of N different types of anomalies, and with labels or classifications assigned to the types of anomalies. The training data may again be obtained from a wide variety of microservices for each type of anomaly. Using the labeled training data, ML trainer 208 may train anomaly classification model 212 so as to output a classification, label, or category for an anomaly based on an input of a structured dataset of performance metrics.

To train microservice classification model 214, for example, training data may be obtained for each of M different types of microservices, and with labels or classifications assigned to the types of microservices. Using the labeled training data, ML trainer 208 trains microservice classification model 214 so as to output a classification, label, or category for a microservice based on an input of a structured dataset of performance metrics, or more particularly, based on a sequence of system calls from a microservice.

After the training phase, ML system 204 may be used to output a classification based on input data. ML system 204 may also produce a score (e.g., output of a loss function in a ML model) that reflects the confidence in the classification.

Figure 4:
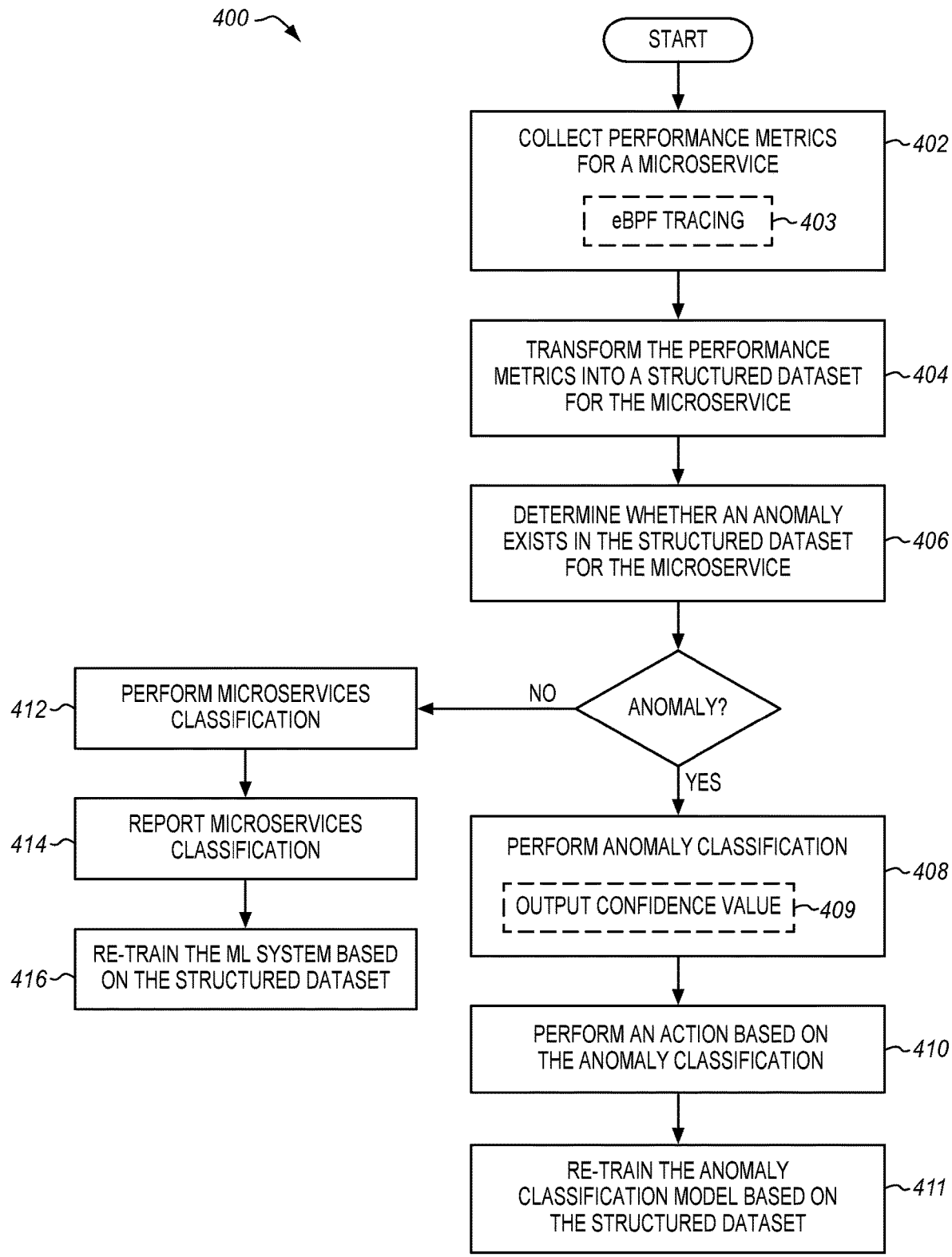
FIG. 4 is a flow chart illustrating a method of anomaly detection and handling in an illustrative embodiment.

With ML system 204 trained, anomaly detector 150 may be used to monitor microservices 120-124 while operational in a production environment. FIG. 4 is a flow chart illustrating a method 400 of anomaly detection and handling in an illustrative embodiment. The steps of method 400 will be described with reference to anomaly detector 150 in FIG. 2, but those skilled in the art will appreciate that method 400 may be performed in other systems. The anomaly detection process in FIG. 4 is described for an individual microservice, such as microservice 120. However, it is understood that anomaly detector 150 may perform a similar process for each of the microservices 120-124 of an application 112.

To begin, a tracer 130 collects performance metrics for microservice 120 (step 402). The performance metrics may comprise a stream of timestamped performance metrics that indicate the run-time behavioral characteristics of the microservice 120. For example, the performance metrics may include a sequence of system calls issued by microservice 120, such as while microservice 120 interacts with the host operating system (e.g., to access file systems and networks, synchronize threads, etc.). Tracer 130 may collect a threshold number of the system calls for the sequence beginning with the first one of the system calls. Tracer 130 may ignore subsequent system calls following the threshold number of system calls so that the sequence is limited to the threshold number. In other embodiments, the performance metrics may include: frequency counts of individual ones of the system calls (i.e., system call frequency) issued by the microservice 120 during a unit time, an amount of Central Processing Unit (CPU) cycles (i.e., on-CPU time) scheduled on the microservice 120 during the unit time, a number of times (i.e., task switch count) that the microservice 120 is scheduled off the CPU during the unit time, a number of incoming and outgoing Transmission Control Protocol (TCP) connections (i.e., TCP connection count) maintained by the microservice 120 during the unit time, a number of TCP retransmissions (i.e., TCP retransmission count) made by the microservice 120 during the unit time, a number of packets or a number of bytes received or transmitted during the unit time, a ratio of in-kernel page cache hit/miss (i.e., page cache hit/miss ratio) associated with the microservice 120 during the unit time, a number of read/write bytes and latencies (i.e., block I/O latency) during the unit time, a number of processes (i.e., process creation count) spawned by the microservice 120 during the unit time, a number of files (i.e., file creation count) created by the microservice 120 during the unit time, a number of files (i.e., file open count) opened by the microservice 120 during the unit time, a number of types of signals issued by the microservice 120 during the unit time, and/or other metrics.

As described above, tracer 130 may comprise an eBPF tracer 138 in one embodiment. An eBPF tracer 138 uses eBPF-based in-kernel tracing technology to collect an extensible list of timestamped or time-series performance metrics (optional step 403), such as described above. Due to the transparent nature of eBPF tracing, the list of collected performance metrics may be extended if necessary, without affecting deployed microservices.

Figure 5:
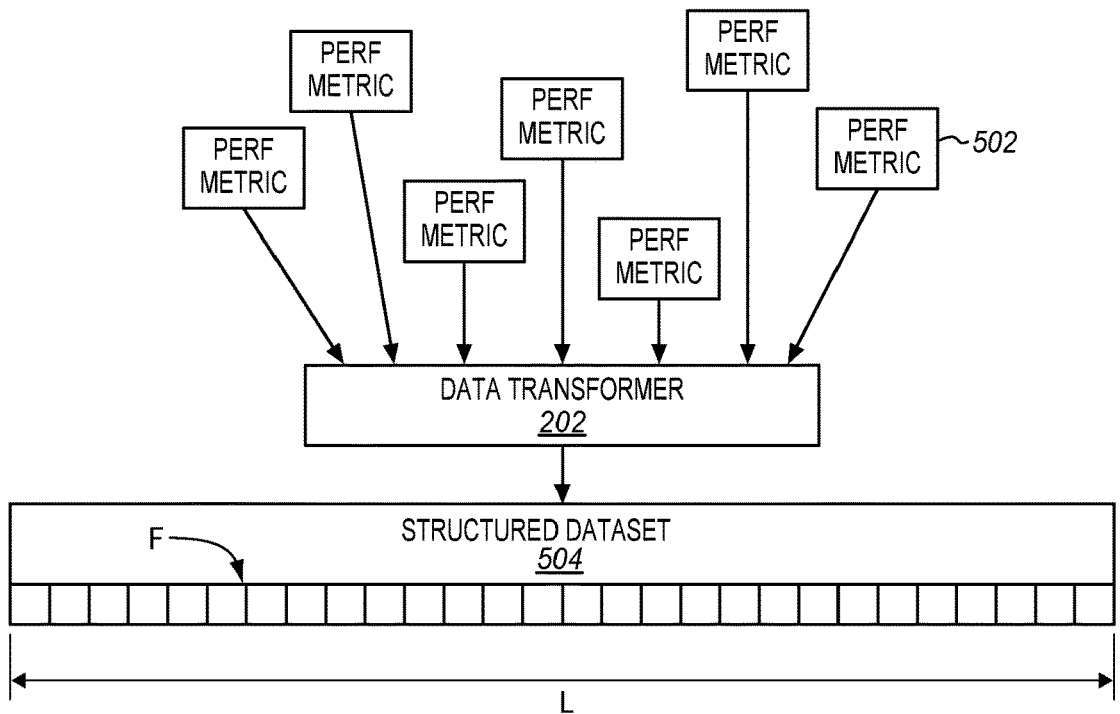
FIG. 5 is a block diagram of a data transformer transforming performance metrics in an illustrative embodiment.

During or after collection of the performance metrics, tracer 130 transmits the performance metrics to data transformer 202, such as over network 110, which are collected by data transformer 202. Data transformer 202 transforms the performance metrics into a structured dataset for microservice 120 (step 404). FIG. 5 is a block diagram of data transformer 202 transforming performance metrics in an illustrative embodiment. The performance metrics 502 received by data transformer 202 are comprised of data that is time-stamped, so data transformer 202 is able to construct a multi-dimensional time series structured dataset 504 for microservice 120. As described above, structured dataset 504 is arranged in time series, and may have a defined length (L) and format (F). Data transformer 202 then feeds the structured dataset 504 to ML system 204.

In response to receiving the structured dataset 504, ML system 204 may perform one or more classifications based on the structured dataset 504. One classification is used for anomaly detection to determine whether an anomaly exists in the structured dataset 504. An anomaly in the structured dataset 504 indicates a corresponding anomaly within the microservice 120, such as a security or performance anomaly.

For anomaly detection in FIG. 4, ML system 204 processes the structured dataset 504, and determines or detects whether an anomaly exists in the structured dataset 504 based on anomaly detection model 210 (step 406). Anomaly detection model 210 is trained on the baseline behaviors of microservices 120-124 so that any type of anomaly that deviates from normal execution behaviors may be detected. During training, ML system 204 may be trained for each microservice or microservice type. ML system 204 learns to capture representative features of "normal" time series data into fixed-length feature vectors, which it may use to reconstruct the original training time-series data. During testing, if ML system 204 is fed with abnormal time series data not seen during training, it may yield a relatively high reconstruction loss from which the abnormality of the time series data is detected.

Figure 6:
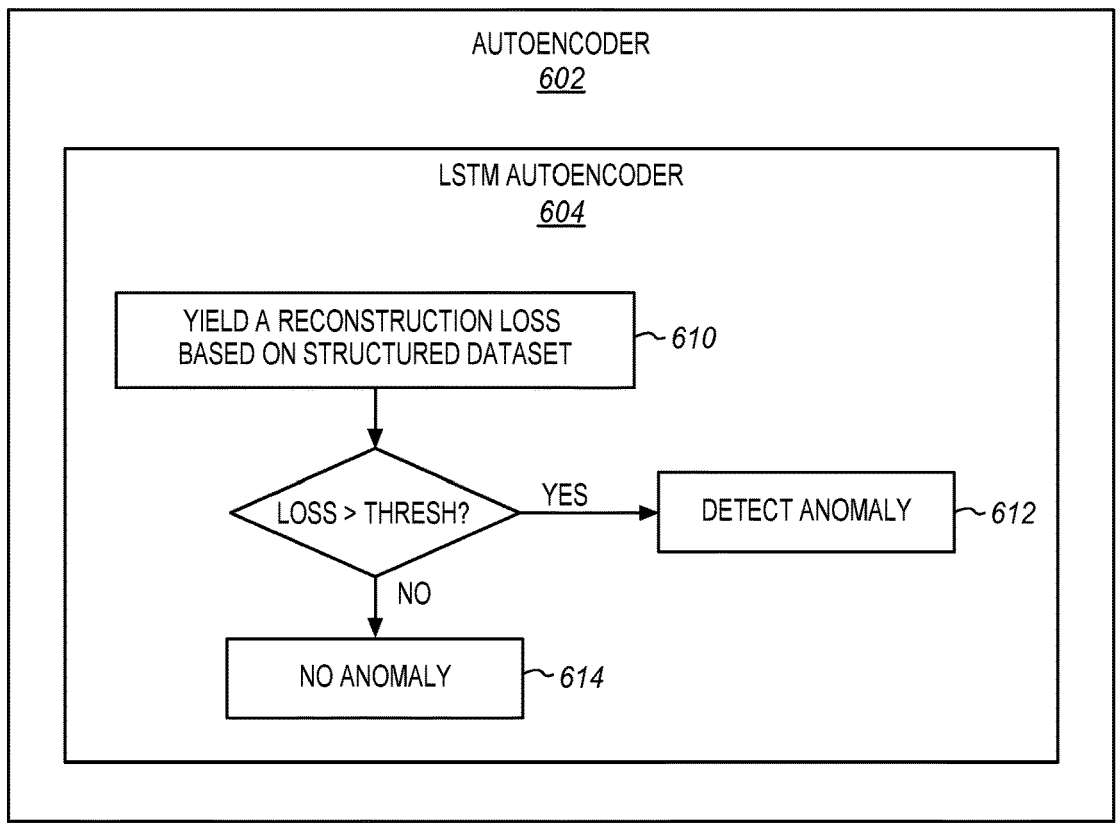
FIG. 6 is a block diagram of an autoencoder in an illustrative embodiment.

In one embodiment, ML system 204 may use or implement an autoencoder for anomaly detection. FIG. 6 is a block diagram of an autoencoder 602 in an illustrative embodiment. Autoencoder 602 is an unsupervised artificial neural network that learns how to compress and encode data, and learns how to reconstruct the data back from the reduced encoded representation to a representation that is as close as possible to the original input. One type of autoencoder 602 is a Long Short-Term Memory (LSTM) autoencoder 604. LSTM autoencoder 604 learns representative time series data generated by a microservice or microservice type. For example, let $AE_i$ denote LSTM autoencoder 604 trained for microservice type i. FIG. 6 illustrates further steps of method 400 in performing anomaly detection, which may be performed according to the algorithm shown in Table 1. $AE_i$ yields a reconstruction loss l based on the structured dataset 504 traced from microservice 120 (step 610). When the reconstruction loss is greater than a reconstruction loss threshold, an anomaly or outlier is detected in the structured dataset 504 from microservice 120 (step 612). When the reconstruction loss is less than or equal to the reconstruction loss threshold, no anomaly is detected in the structured dataset 504 from microservice 120 (step 614).

TABLE 1

```
procedure detect_anomaly(T, G, L̂)
input: T, /* N-dimensional time-series test data */
       G, /* group of microservices to test against */
       L̂ /* reconstruction loss threshold */
output: TRUE or FALSE
    min_loss ← MAX_LOSS
    /* find minimum reconstruction loss in G */
    for each microservice type i in G do
        loss ← evaluate_model(AE_i, T)
        if min_loss > loss then
            min_loss ← loss
        end if
    end for
    if min_loss > L̂ then
        return TRUE /* T is anomalous */
    else
        return FALSE /* T is normal */
    end if
end procedure
```

ML system 204, such as through autoencoder 602, may therefore output an indicator of "TRUE" when an anomaly is detected in the structured dataset 504, and output an indicator of "FALSE" when no anomaly is detected in the structure dataset 504.

Another classification by ML system 204 may be used for policy enforcement when an anomaly is detected within a microservice 120. For policy enforcement, it may be beneficial to know the identity of the anomaly (i.e., the root cause of the anomaly). Thus, when an anomaly is detected in the structured dataset 504, ML system 204 performs an anomaly classification based on anomaly classification model 212 (step 408). In other words, ML system 204 attempts to classify the anomaly (i.e., the root cause of the anomaly) based on anomaly classification model 212 and the structured dataset 504. An underlying assumption may be that the microservice deployment environment is under the tight control of data center operators. Thus, microservices 120-124 are deployed from the fixed microservice universe $E=\{E_1, E_2, \ldots, E_n\}$, and no other microservices are deployable. It may be further assumed that when an anomaly is detected, the reason for the anomaly is among N possible candidates or categories. For example, the candidates or categories may include: the microservice is experiencing CPU contention with at least another co-located microservice workload, the microservice is waiting on I/O operations due to a saturated I/O block device, the microservice is experiencing an insufficient memory resource issue, the microservice is producing unrecoverable invalid memory access errors, the microservice is experiencing a high rate of network congestion or packet losses, the microservice is experiencing brute-force authentication attacks (e.g., for a web-based login service), the microservice is suffering from a Distributed Denial-Of-Service (DDoS) attack, the microservice is infected with malware, etc.

One assumption is that anomaly classification model 212 is already trained using abnormal datasets collected beforehand for each of these N different anomaly types. Thus, ML system 204 is able to identify which among the N possible candidates is causing the anomaly by using anomaly classification model 212. In addition to performing the anomaly classification, ML system 204 may also output a confidence value (e.g., output of a loss function used by the model) based on the anomaly classification model 212 (optional step 409). Thus, when the anomaly does not belong to the N candidates (i.e., previously unseen anomaly such as a new type of zero-day attack), the confidence value produced by anomaly classification model 212 is expected to be low, from which the presence of a previously unseen anomaly can be identified.

After identifying the anomaly, policy enforcement controller 206 may then perform one or more actions based on the anomaly classification (step 410), such as to enforce a policy. A data center operator may define policies for handling anomalies based on the type of anomaly. Thus, policy enforcement controller 206 enforces these policies when the anomaly is automatically identified by ML system 204 based on the structured dataset 504 for microservice 120. ML trainer 208 may also re-train anomaly classification model 212 based on the structured dataset 504, which contains the known and identified anomaly (step 411).

Figure 7:
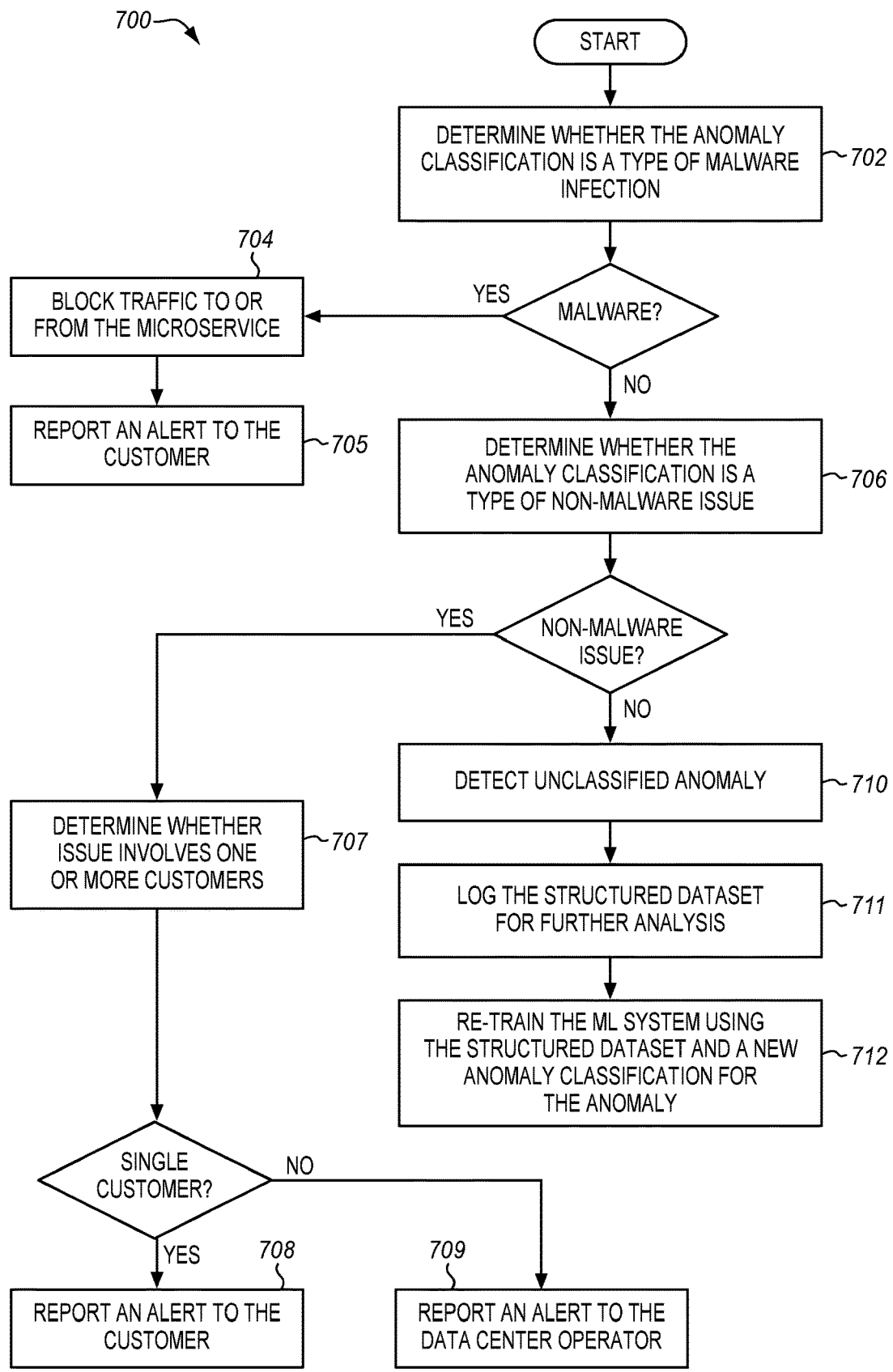
FIG. 7 is a flow chart illustrating a method of enforcing policies for an anomaly in an illustrative embodiment.

FIG. 7 is a flow chart illustrating a method 700 of enforcing policies for an anomaly in an illustrative embodiment. The steps of method 700 may be considered part of step 410 of method 400. According to method 700, policy enforcement controller 206 determines whether the anomaly classification (or root cause of the anomaly) is a type of malware infection (step 702). Thus, policy enforcement controller 206 determines whether ML system 204 classified the anomaly as one of the N candidates that is associated with a type of malware infection. In the art, the term "malware" generally refers to a malicious software application. A malicious software application may be used to perform a number of malicious actions, such as stealing data, using a microservice in the perpetration of other malicious activities (e.g., such as sending out unsolicited messages or spam), remotely controlling another machine, and/or inhibiting a microservice from operating normally. When the anomaly classification is a type of malware infection, the corresponding policy may be to block traffic in and out of the infected microservice 120 with a micro-segmentation scheme to isolate the infected microservice 120. Thus, policy enforcement controller 206 may block traffic to or from the microservice 120 (step 704), when the anomaly classification is a type of malware infection. To illustrate an example of blocking traffic to or from the microservice 120, every packet generated by a microservice 120 is stamped with a tag that encodes fine-grained contexts of the microservice 120. Example contexts include a microservice identity (e.g., name/version), geographic location, kernel version, as well as malware infection status. When a tagged packet is received, the receiver end extracts the tag, decodes it back to the sender-side contexts, and applies micro-segmentation policies (e.g., accept/drop) based on the sender-side contexts as well as the recipient's contexts. If such a context-based micro-segmentation scheme is in place, data center operators can set up a protection policy that blocks any traffic destined to or sent by a microservice whose malware infection status set to "TRUE". When ML system 204 detects a malware infection in a microservice 120, all of its processes have their malware infection status updated instantly in the context map. This will automatically block any traffic generated or consumed by malware-infected processes even without relying on network-based access control. Policy enforcement controller 206 may also report an alert to the affected customer (step 705) of the type of malware infection and the corresponding quarantine action applied to its microservice.

When the anomaly classification is not a type of malware infection, the corresponding policy may be to perform further actions. In one embodiment, policy enforcement controller 206 determines whether the anomaly classification is a type of non-malware issue (step 706). A non-malware issue may be a type of performance issue or a type of non-malware security issue. A performance issue is an event that causes a degradation of the performance of a microservice, such as CPU contention, delay in I/O operations, insufficient memory, producing unrecoverable invalid memory access errors, experiencing a high rate of network congestion or packet losses, etc. A non-malware security issue is an event that causes a security risk other than a malware infection, such as network-level/application-level DDoS attacks, brute-force authentication attacks, etc. When the classification of the anomaly is a type of non-malware issue, policy enforcement controller 206 determines whether the issue involves one or more customers (step 707). When the issue involves a single customer, policy enforcement controller 206 may report an alert to the affected customer that has access to application 112 (step 708). According to the policy, when one of the known non-malware issues is detected, policy enforcement controller 206 may send an alert to the responsible customer, such as through customer interface 118, so that the customer can take an action to address the issue. For example, when an alert for insufficient memory is received, the customer can add additional memory to a rented data center resource pool. When an alert for invalid memory access is received, the customer can take a responsible microservice offline and debug it. When an alert for application slowdown from DDoS attacks is received, the customer can work with the data center operator to resolve the issue. Policy enforcement controller 206 may insert an indicator of the type of non-malware issue (i.e., a label from the candidate anomaly) in the alert to the customer.

When the type of non-malware issue involves more than one customer, policy enforcement controller 206 may report an alert to the data center operator (step 709), such as through data center operator interface 117. For example, if the detected non-malware issue is resource contention involving more than one customer (e.g., performance interference reported for multiple customers' microservices on a particular server simultaneously, which indicates interference is among those co-located customers, or shared disk resources of a particular server showing symptom of congestion), then policy enforcement controller 206 may send an alert to the data center operator so that the data center operator can take an action to address the reported issue without involving the customers. The data center operator can migrate some of affected customers' microservices to another server to mitigate the performance interference or reduce disk I/O congestion. Policy enforcement controller 206 may insert an indicator of the type of non-malware issue in the alert to the data center operator.

When the anomaly classification is not a type of non-malware issue, it may be assumed that the anomaly does not belong to any of the N candidates (e.g., a new type of zero-day attack or newly introduced performance bug) used to train anomaly classification model 212 as described above. Thus, ML system 204 does not output a valid anomaly classification from the N candidates. Even though ML system 204 does not output a valid anomaly classification (e.g., inference loss above a threshold), ML system 204 detects the presence of an unclassified anomaly (step 710) by examining the value of inference loss returned by anomaly classification model 212. The inference loss returned by anomaly classification model 212 is expected to be low when an anomaly is one of those N candidates. If the anomaly is not one of the N anomaly candidates, anomaly classification model 212 will produce a relatively high inference loss from which a new type of previously unseen anomaly may be inferred. When an unknown anomaly is detected, policy enforcement controller 206 may log the structured dataset 504 for further analysis (step 711). The structured dataset 504 for the microservice 120 may then be used to re-train the anomaly classification model 212 to incorporate the newly discovered anomaly. For instance, the group of N candidates of anomalies may be extended to the group of (N+1) candidates, and a new label or classification may be assigned to the new candidate. ML trainer 208 may then re-train the anomaly classification model 212 with the structured dataset 504 and the new anomaly classification assigned to the anomaly (step 712). ML trainer 208 therefore adds a new candidate to the group of N candidates when ML system 204 does not output a valid classification from the group of N candidates, with the new anomaly classification and corresponding structured dataset 504.

In FIG. 4, when the structured dataset 504 from microservice 120 is determined to be normal and an anomaly is not detected (step 406), ML system 204 may optionally derive the identity of microservice 120 from the structured dataset 504. Thus, ML system 204 performs a microservice classification based on microservice classification model 214 (step 412). In other words, if the structured dataset 504 is determined to be normal, the next step may be to classify the microservice 120 into one of the M existing microservice categories or microservice types to derive its identity (e.g., type/name of the microservice), which may also be referred to as microservice fingerprinting. Policy enforcement controller 206 may then report the microservice classification of the microservice 120 to an operator of the data center (step 414), such as through data center operator interface 117, or to another entity. There may be several reasons why microservice classification is performed in this step. If data center operators can accurately identify the types of microservices that are deployed, it can help schedule microservice workloads with minimum performance interference within servers (e.g., limiting the number of latency-sensitive workloads within the same server). Also, it can provide application-level traffic engineering, such as allowing latency-sensitive, real-time microservice traffic to be prioritized over best-effort traffic (e.g., by tagging workload identity within network traffic, which is used to route traffic in a prioritized fashion). Further, application-level monitoring information allows the data center operator to forecast long-term growth in data center resource demand.

Microservice classification may be driven by a supervised Bayesian model (e.g., microservice classification model 214) fed with a sequence of system calls from microservice 120, which is described in detail in the following. A microservice usually runs as a stand-alone process or inside a container. The execution of a microservice in either form may be referred to as a microservice engine. Each microservice engine invokes a stream of system calls, which may be referred to as verbs. Let V denote the universe of verbs and $E=\{E_1, E_2, \ldots, E_n\}$ denote the set of engines. For modeling, the verbs may form a random process. Let $V_1^j$, $V_2^j$, ... represent the ordered sequence of verbs invoked when engine $E_1$ is executed. The $i^{th}$ verb invoked when engine $E_j$ is executed is denoted by the random variable $V_i^j$ which takes on values from the set V. The goal of the Bayesian model is to characterize the underlying probabilities of this random process so that a microservice's unique characteristics (i.e., fingerprint) can be expressed through the probabilities.

Training data for each engine may be generated by executing the engine and collecting the sequence of verbs invoked by the engine, which is referred to as a training sequence. Each engine has one training sequence. Assume that we have a training sequence of length $n_j$ verbs from engine $E_j$. Let $T^j=T^j(0), T^j(1), \ldots, T^j(n_j))$, where $T_j(t) \in V$ denotes the $t^{th}$ verb invoked by engine $E_j$. We use $v=(v_0, v_1, \ldots, v_{k-1})$ where $v_i \in V$, to represent a k dimensional vector of verbs. We say that v is at location t for engine $E_j$ if $T^j(t)=v_0, T^j(t-1)=v_1, \ldots, T^j(n-k)=v_k$. We use $V^k$ to denote the set of all combinations of verbs of length k. Therefore, there are $|V|^k$ vectors in $V^k$. We define an indicator variable $I^j(t, v)$, which is set to one if and only if $T^j(t-i)=v_i$, where $0 \le i \le k$. In other words, $I^j(t, v)$ is set to one if the sequence v is at location t for engine $E_j$. If we want to estimate the probability that sequence $v \in V^k$ occurs when engine $E_j$ is invoked, we can use the standard frequency definition of probabilities to say:

$$p^j(v) = \frac{\sum_{t=k}^{n_j} I^j(t)}{n_j}$$

We are interested in computing $p^j(v|v)$, which is the probability that a verb $v \in V$ occurs immediately after the occurrence of the sequence of verbs v in the invocation of engine $E_j$. We use the training sequence to estimate this conditional probability.

When observing a test sequence of verbs $v=(v_1, v_2, \ldots, v_n)$ from a microservice, the objective is to determine the probability that this sequence is generated by the engine $E_j$ of the microservice. We use the notation $v[i: j]$ to represent the test sub-sequence $(v_i, v_{i-1}, \ldots, v_j)$. We use a Bayesian approach to determine this probability. We denote the probability that the engine is $E_j$ given that we are observing a test sequence v by $P[E_j|v]$. We use Bayes theorem to write:

$$P[E_j | v] = \frac{P[v | E_j]P[E_j]}{P[v]}$$

If we do not have any prior information about the engines, we assume that $$P[E_j] = \frac{1}{n}$$

(where n is the number of engines learnt by the supervised learning) for all engines $E_j$. Therefore, $P[E_j|v] \propto P[v|E_j]$. Since we typically use order-k models for small k, we ignore the k terms before the product and write for order-k:

$$P[v|E_j] \approx \prod_{i=k}^{m} p^j(v_i | v[i-1:i-k])$$

We are interested in picking the engine J with the highest probability:

$$J = \underset{j}{\mathrm{argmax}} P[v|E_j] = \underset{j}{\mathrm{argmax}} \log(P[v|E_j])$$

We use the fact that log( ) is an increasing function, which in turn means that:

$$J = \underset{j}{\mathrm{argmax}} \log(P[v|E_j]) = \sum_{i=k}^{m} p^j(v_i | v[i-1:i-k])$$

The engine with the highest probability is therefore the microservice identity found by microservice classification model 214.

Even when an anomaly is not detected, structured dataset 504 may be used to re-train ML system 204 (step 416) in order to improve its detection accuracy. For example, when an anomaly is not detected in the structured dataset 504, ML trainer 208 may re-train anomaly detection model 210 based on the structured dataset 504 for microservice 120, which is considered to be "normal" performance metrics of a microservice. ML trainer 208 may also re-train microservice classification model 214 based on the structured dataset 504 for microservice 120 and the microservice classification determined for microservice 120 (i.e., microservice classification is conducted successfully) when no anomaly is found.

There may be a scenario where the microservice 120 does not belong to any of the M candidates used to train microservice classification model 214 as described above. Thus, ML system 204 does not output a valid microservice classification from the M candidates. When an unknown microservice is detected, the structured dataset 504 for the microservice 120 may then be used to re-train the microservice classification model 214 to incorporate the newly discovered microservice. For instance, the group of M candidates of microservices may be extended to the group of (M+1) candidates, and a new label or classification may be assigned to the new candidate. ML trainer 208 may then re-train the microservice classification model 214 with the structured dataset 504 and the new microservice classification assigned to the microservice (step 416). Thus, ML trainer 208 adds a new candidate to the group of M candidates when ML system 204 does not output a valid classification from the group of M candidates, with the new microservice classification and corresponding structured dataset 504.

Method 400 may be repeated for each of the microservices 120-124 of application 112. One technical benefit is that anomaly detector 150 is able to automatically monitor each of the microservices 120-124 for an application 112 to look for security and performance anomalies, and take appropriate actions to enforce policies established for a data center. Thus, microservices that are compromised with malware or the like can be contained in an efficient and automated manner.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. An anomaly detector, comprising:
at least one processor; and
at least one memory storing instructions that, when executed by the at least one processor, cause the anomaly detector at least to:
in a training phase:
collect first training data for microservices free from anomalies;
train an anomaly detection model based on the first training data;
collect second training data for N different types of anomalies with labels assigned to the N different types of anomalies; and
train an anomaly classification model using the second training data; and
in an operating phase:
collect timestamped performance metrics for a microservice of an application built with a microservice architecture comprising a set of microservices hosted by servers deployed in a data center;
transform the timestamped performance metrics for the microservice into a time-series structured dataset for the microservice;
feed the time-series structured dataset for the microservice to a machine learning system to determine whether an anomaly exists in the microservice based on the anomaly detection model;
when the anomaly is detected in the time-series structured dataset for the microservice:
perform an anomaly classification of the anomaly from among the N different types of anomalies with the machine learning system based on the anomaly classification model and the time-series structured dataset; and
perform one or more actions when the anomaly classification of the anomaly is among the N different types of anomalies; and
re-train the anomaly classification model based on the time-series structured dataset.

2. The anomaly detector of claim 1 wherein the instructions, when executed by the at least one processor, further cause the anomaly detector at least to:
implement a Long Short-Term Memory (LSTM) autoencoder to determine whether the anomaly exists in the microservice;
wherein the LSTM autoencoder is configured to yield a reconstruction loss based on the time-series structured dataset, to detect the anomaly in the microservice when the reconstruction loss is greater than a reconstruction loss threshold, and to detect no anomaly when the reconstruction loss is less than or equal to the reconstruction loss threshold.

3. The anomaly detector of claim 1 wherein the instructions, when executed by the at least one processor, further cause the anomaly detector at least to:
isolate the microservice from other microservices of the application when the anomaly classification for the microservice indicates a type of malware infection from among the N different types of anomalies.

4. The anomaly detector of claim 1 wherein the instructions, when executed by the at least one processor, further cause the anomaly detector at least to:
report an alert to a customer of the data center when the anomaly classification indicates a type of non-malware issue from among the N different types of anomalies involving a single customer.

5. The anomaly detector of claim 1 wherein the instructions, when executed by the at least one processor, further cause the anomaly detector at least to:
report an alert to an operator of the data center when the anomaly classification indicates a type of non-malware issue from among the N different types of anomalies involving multiple customers.

6. The anomaly detector of claim 1 wherein the instructions, when executed by the at least one processor, further cause the anomaly detector at least to:
when the machine learning system does not output a valid anomaly classification from among the N different types of anomalies:
detect an unclassified anomaly; and
re-train the anomaly classification model with the time-series structured dataset and a corresponding label for the unclassified anomaly.

7. The anomaly detector of claim 1 wherein the instructions, when executed by the at least one processor, further cause the anomaly detector at least to:
collect the timestamped performance metrics for the microservice with a tracer in the data center that uses extended Berkeley Packet Filter (eBPF) in-kernel tracing.

8. The anomaly detector of claim 1 wherein the instructions, when executed by the at least one processor, further cause the anomaly detector at least to:
in the training phase:
collect third training data for M different types of microservices with labels assigned to the M different types of microservices; and
train a microservice classification model using the third training data; and
in the operating phase:
perform a microservice classification from among the M different types of microservices with the machine learning system based on the microservice classification model and a sequence of system calls from the time-series structured dataset when no anomaly is detected in the microservice; and
report the microservice classification to an operator of the data center.

9. The anomaly detector of claim 8 wherein the instructions, when executed by the at least one processor, further cause the anomaly detector at least to:
when the machine learning system does not output a valid microservice classification from among the M different types of microservices:
detect an unclassified microservice; and
re-train the microservice classification model of the machine learning system based on the time-series structured dataset and a corresponding label for the unclassified microservice.

10. The anomaly detector of claim 1 wherein the instructions, when executed by the at least one processor, further cause the anomaly detector at least to:
re-train the anomaly detection model of the machine learning system based on the time-series structured dataset for the microservice when no anomaly is detected in the microservice.

11. The anomaly detector of claim 1 wherein the instructions, when executed by the at least one processor, further cause the anomaly detector at least to:
collect the timestamped performance metrics for the microservice with a tracer implemented on a same one of the servers as the microservice.

12. A method of anomaly detection for a microservice, the method comprising:
  in a training phase:
    collecting first training data for microservices free from anomalies;
    training an anomaly detection model based on the first training data;
    collecting second training data for N different types of anomalies with labels assigned to the N different types of anomalies; and
    training an anomaly classification model using the second training data; and
  in an operating phase:
    collecting timestamped performance metrics for the microservice of an application built with a microservice architecture comprising a set of microservices hosted by servers deployed in a data center;
    transforming the timestamped performance metrics for the microservice into a time-series structured dataset for the microservice;
    feeding the structured dataset for the microservice to a machine learning system to determine whether an anomaly exists in the microservice based on the anomaly detection model;
  when the anomaly is detected in the time-series structured dataset for the microservice:
    performing an anomaly classification of the anomaly from among the N different types of anomalies with the machine learning system based on the anomaly classification model and the time-series structured dataset; and
    performing one or more actions when the anomaly classification of the anomaly is among the N different types of anomalies; and
  re-training the anomaly classification model based on the time-series structured dataset.

13. The method of claim 12 wherein the determining whether an anomaly exists in the microservice based on the anomaly detection model comprises:
  determining whether the anomaly exists in the microservice using a Long Short-Term Memory (LSTM) autoencoder by:
    yielding a reconstruction loss based on the time-series structured dataset;
    detecting the anomaly in the microservice when the reconstruction loss is greater than a reconstruction loss threshold; and
    detecting no anomaly when the reconstruction loss is less than or equal to the reconstruction loss threshold.

14. The method of claim 12 wherein the performing the one or more actions comprises:
  isolating the microservice from other microservices of the application when the anomaly classification for the microservice indicates a type of malware infection from among the N different types of anomalies.

15. The method of claim 12 wherein the performing the one or more actions comprises:
  reporting an alert to a customer of the data center when the anomaly classification indicates a type of non-malware issue from among the N different types of anomalies involving a single customer.

16. The method of claim 12 wherein the performing the one or more actions comprises:
  reporting an alert to an operator of the data center when the anomaly classification indicates a type of non-malware issue from among the N different types of anomalies involving multiple customers.

17. The method of claim 12 further comprising:
  when the machine learning system does not output a valid anomaly classification from among the N different types of anomalies:
    detecting an unclassified anomaly; and
    re-training the anomaly classification model with the time-series structured dataset and a corresponding label for the unclassified anomaly.

18. The method of claim 12 wherein the collecting the timestamped performance metrics for the microservice comprises:
  collecting the timestamped performance metrics for the microservice with a tracer in the data center that uses extended Berkeley Packet Filter (eBPF) in-kernel tracing.

19. The method of claim 12 further comprising:
  in the training phase:
    collecting third training data for M different types of microservices with labels assigned to the M different types of microservices; and
    training a microservice classification model using the third training data; and
  in the operating phase:
    performing a microservice classification from among the M different types of microservices with the machine learning system based on the microservice classification model and a sequence of system calls from the time-series structured dataset when no anomaly is detected in the microservice; and
    reporting the microservice classification to an operator of the data center.

20. A non-transitory computer readable medium embodying programmed instructions executed by one or more processors, wherein the instructions direct the one or more processors to implement a method of anomaly detection, the method comprising:
  in a training phase:
    collecting first training data for microservices free from anomalies;
    training an anomaly detection model based on the first training data;
    collecting second training data for N different types of anomalies with labels assigned to the N different types of anomalies; and
    training an anomaly classification model using the second training data; and
  in an operating phase:
    collecting timestamped performance metrics for a microservice of an application built with a microservice architecture comprising a set of microservices hosted by servers deployed in a data center;
    transforming the timestamped performance metrics for the microservice into a time-series structured dataset for the microservice;
    feeding the time-series structured dataset for the microservice to a machine learning system to determine whether an anomaly exists in the microservice based on the anomaly detection model;
  when the anomaly is detected in the time-series structured dataset for the microservice:
    performing an anomaly classification of the anomaly from among the N different types of anomalies with the machine learning system based on the anomaly classification model and the time-series structured dataset; and performing one or more actions when the anomaly classification of the anomaly is among the N different types of anomalies; and re-training the anomaly classification model based on the time-series structured dataset.

\* \* \* \* \*